March 31, 1936. E. J. HOUDRY 2,035,478
PRODUCTION OF MOTOR FUEL
Filed July 20, 1932
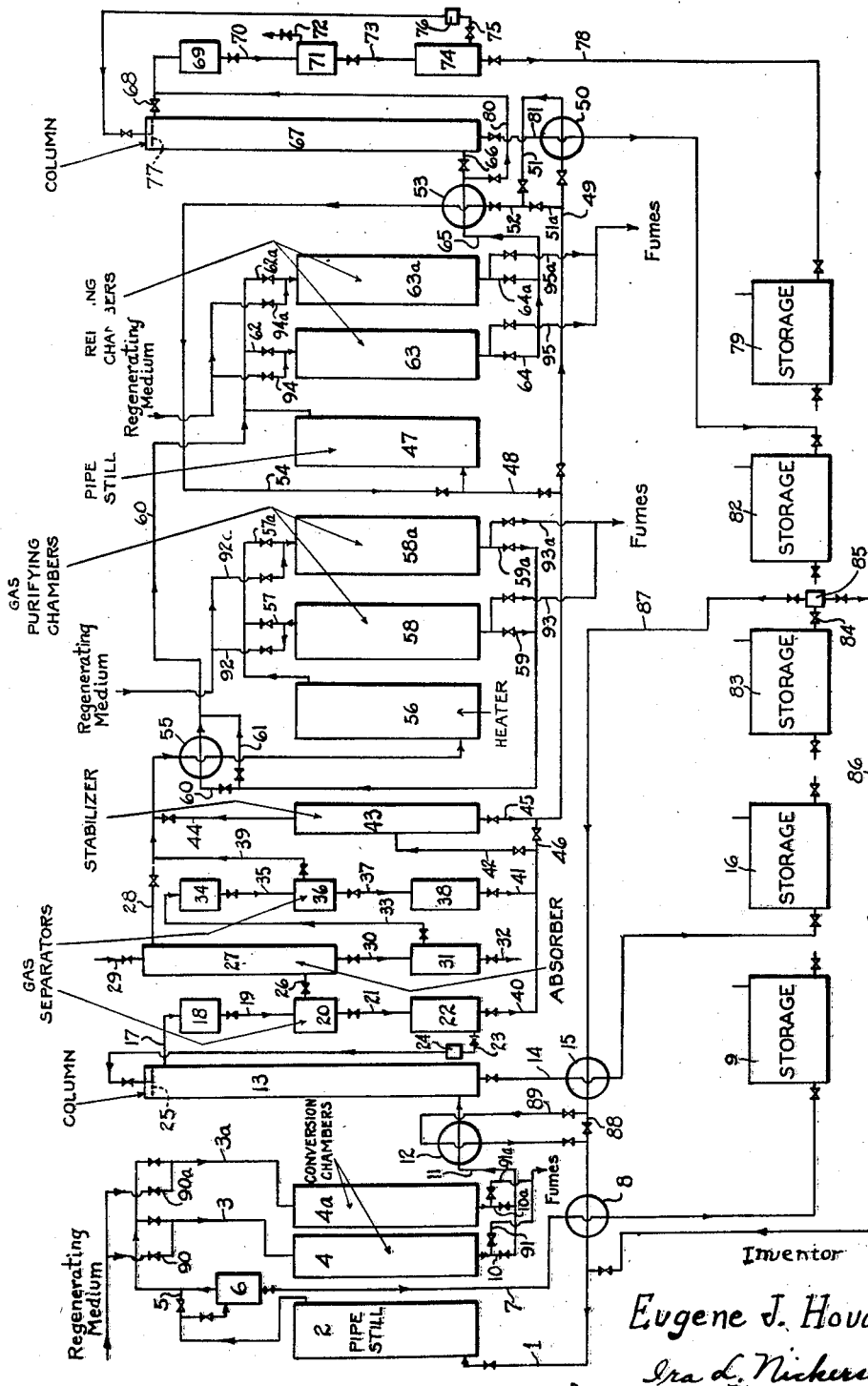
Inventor
Eugene J. Houdry
By Ira L. Nickerson
Attorney Patented Mar. 31, 1936

2,035,478

UNITED STATES PATENT OFFICE 2,035,478

PRODUCTION OF MOTOR FUEL

Eugene J. Houdry, Paris, France, assignor to Houdry Process Corporation, Dover, Del., a corporation of Delaware Application July 20, 1932, Serial No. 623,682

8 Claims. (Cl. 196—52)

This invention relates to processes of and apparatus for producing motor fuel by the conversion of high boiling hydrocarbons into low boiling hydrocarbons and for refining the latter so as to secure a finished product. In its preferred form, all chemical transformations are effected by the use of catalysts capable of and intended to be regenerated in situ, but the advantages of the invention may be attained in considerable degree when the primary conversion is a pyrolytic cracking operation.

A principal object of the invention is to secure a maximum yield of motor fuel from any starting material. Another object is to produce motor fuel of superior quality having such characteristics as high anti-knock rating, stability, good color, no offensive odor, absence of gum and gum forming constituents, etc. Another object is to increase or lengthen the period of operation of the refining catalyst. Another object is to permit the use of a standard refining catalyst for all kinds of starting material. Still other objects will be apparent from the detailed description which follows.

The invention contemplates the use of a refining catalyst capable of completing the treatment of the desired hydrocarbon material and of producing a polymerizing effect whereby certain of the very light vapors or fixed gases are brought down within the motor fuel range. Such a catalyst is rapidly poisoned by certain compounds in the starting material especially those compounds which comprise or contain sulphur. These compounds, for the most part, are found in the fixed and incondensable gases which are present after the conversion or transformation of the starting material and which may be wholly or to a very large extent eliminated by a suitable purifying operation affecting the gases only. For this operation, a catalyst is used which can be regenerated and which removes the sulphur from the hydrogen sulphide ($H_2S$) present in the gases and which will break down certain complex gaseous compounds such as mercaptans, sulphides of organic radicals, etc., releasing the sulphur in the form of $H_2S$ and then removing the sulphur to leave free hydrogen. When the gases are thus purified before contact with the refining catalyst, poisoning of the latter is much retarded, with the result that the refining catalyst will function in a satisfactory manner for a longer period of time before regeneration is required.

In practice, all of the fixed and incondensable gases are separated out after the conversion step for purification. This requires condensation of the converted material, preferably after fractionation. The condensate, preferably after stabilization, is revaporized and passed, together with all of the gases from the purifying step, directly into contact with the refining catalyst. What effect the refining catalyst has on the lighter gases cannot be accurately described at this time, but an increased yield of motor fuel over that to be expected before the vapors and gases contact with this catalyst indicates a polymerizing effect and a degree of hydrogenation with the free hydrogen left on decomposition of the $H_2S$ in the purifying step for the gases, plus the hydrogen normally resulting from the transformation of heavy hydrocarbons into light hydrocarbons.

In order to illustrate the invention and the manner of its operation, a preferred form thereof is shown in the accompanying drawing, the single view being largely diagrammatic, with certain parts of the apparatus indicated in side elevation.

Any suitable or desired apparatus for effecting the primary conversion or transforming of the high boiling hydrocarbons into low boiling hydrocarbons may be used. In the form shown in the drawing, the starting material, either heated or at atmospheric temperature, enters pipe still 2 by valved line 1 and discharges either by valved line 3 or 3a into one or the other of two heat-insulated catalytic chambers 4 or 4a containing catalytic material capable of effecting the desired conversion and of being regenerated in situ. If the starting material, such as a gas oil, is completely vaporized, it passes directly to lines 3 and 3a by a valved connection 5. Otherwise, it is directed into a separator 6 from which the vapors pass to the conversion chambers while the liquids are drained away through a valved connection 7 which passes through heat exchanger 8 and discharges into a storage tank 9. The converted vapors from chambers 4 and 4a are directed through valved outlets 10 and 10a into vapor line 11 which passes through heat exchanger 12 into fractionating column 13. The liquids thrown down in column 13 are withdrawn by valved drain 14 which leads through heat exchanger 15 into storage tank 16. Gases and low boiling vapors pass from the upper portion of column 13 through line 17 to a condenser 18 which has a valved outlet 19 discharging into gas separator 20. The liquid drains through a valved connection 21 into receiver 22. A portion of the condensate in 22 may be withdrawn through a valved connection 23 and forced by pump 24 to a distributor 25 in the top of fractionating column 13 to effect temperature control therein.

The fixed gases and uncondensed vapors escape from gas separator 20 through valved connection 26 into an absorber 27 of any suitable or desired type, and leave by valved line 28. The absorber shown uses a low boiling liquid condensate which enters through valved line 29 to scrub the gases, the enriched condensate or absorbent leaving by valved line 30 which discharges into a heater or still 31, where the absorbed vapors are stripped from the low boiling condensate which leaves as lean absorbent through valved line 32. The stripped vapors pass by valved line 33 into a condenser 34, thence by valved line 35 into a second gas separator 36, from which the liquid condensate passes by valved line 37 into liquid receiver 38, while the gases from separator 36 pass by valved line 39 into main gas line 28.

The raw liquid product of the desired boiling range, now in receivers 22 and 38, is withdrawn through valved outlets 40 and 41, respectively, and is preferably passed by valved connection 42 to a stabilizer 43 of any suitable or desired type, where the gases and very light vapors which are dissolved in the liquid are released and pass by valved line 44 into main gas line 28. The stabilized liquid is withdrawn through a valved connection 45, and then passes to the refining apparatus. If desired, the stabilizing step may be omitted by using the valved by-pass 46.

The liquid product issuing from line 45 or through by-pass 46 must be revaporized and to this end may be passed directly to pipe-still 47 by valved connection 48, or may be preheated before reaching pipe still 47 by passing the same through valved connection 49, heat exchanger 50, valved line 51, valved line 52, heater exchanger 53 and valved line 54. To give flexibility of control in the preheating of the raw liquid, heat exchanger 50 may be avoided by the use of valved by-pass 51a.

Meantime the gases in main gas line 28 which have been collected from the absorber 27, second gas separator 36 and stabilizer 43, pass through a heat exchanger 55 into a heater 56 of any suitable or desired type, where their temperature is raised to that required for the subsequent purifying operation. The heater gases pass by valved connection 57 or 57a into either of two purifying chambers 58 or 58a, which contain catalytic material capable of removing organic sulphur, or breaking down complex hydrocarbons containing sulphur and of then removing such sulphur, and of otherwise purifying the gases and removing all or most of the substances which will poison or tend to poison the catalyst used in the subsequent refining operation. The purified gases leave chambers 58 and 58a by valved connections 59 and 59a, and pass by valved line 60 through heat exchanger 55 to the refining section. Heat exchanger 55 may be by-passed by valved connection 61, if desired.

The purified gases in line 60 and the revaporized liquid from pipe still 47 pass together, at the proper operating temperature, through valved connection 62 or 62a, into either of two refining chambers 63 and 63a containing catalytic material capable of effecting a final refining and polymerizing action, and also capable of regeneration in situ. The refined product, in vapor form, is discharged through valved connection 64 or 64a into vapor line 65, passes through heat exchanger 53 and preferably discharges by valved connection 66 into a second fractionating column 67. The fractionated vapors escape through a valved connection 68 into a condenser 69 which discharges, by valved connection 70, into gas separator 71, from which the fixed gases are withdrawn by a valved connection 72, while the refined liquid product is withdrawn by valved connection 73 into a receiver 74. A portion of the condensate in receiver 74 may be withdrawn by valved connection 75, and discharged by pump 76 into a distributor 77 in the top of column 67, to control the temperatures therein. The completely refined product may be withdrawn from receiver 74 by valved line 78 to storage tank 79. If desired, the second fractionating column 67 may be avoided by using valved by-pass 80. Liquid thrown down in fractionating column 67 is discharged through valved connection 81 and heat exchanger 50 into storage tank 82.

The starting material in storage tank 83 may be withdrawn through a valved connection 84 and forced by pump 85 through a valved line 86 directly to line 1 leading to pipe still 2, or preheating of the starting material may be effected by causing pump 85 to discharge into valved line 87 which passes through heat exchanger 15 and thence directly by valved connection 88 and heat exchanger 8 into line 1 or valved line 88 may be closed, so that the starting material is forced to pick up additional heat by passing through valved line 89 and heat exchanger 12. After the fresh feed in tank 83 is exhausted, additional runs on recycling stock may be made by connecting tanks 82, 16 either together or successively to pump 85.

The catalyst chambers 4, 4a, and 58, 58a, and 63, 63a are provided in pairs, in order that the plant may be in continuous operation, with one chamber of each pair on stream while the other is in regeneration. Thus, each chamber alternates in function. The chambers are supplied with catalysts suitable for their respective operations, and in such shape and form as to permit regeneration in situ. Certain suitable catalytic materials for conversion and for the combined refining and polymerizing operation are disclosed in the copending application of Eugene J. Houdry, Serial No. 600,581, filed March 23, 1932. The gas purifying chambers 58, 58a contain any suitable or desired material for removing sulphur and/or other objectionable compounds, and for otherwise purifying the gases directed thereto from heater 56. To permit regeneration of the purifying contact masses, it is preferable to use finely divided metals or metallic oxides supported by carriers of the type disclosed in the United States patents of Alfred Joseph, Nos. 1,775,366 and 1,818,403, dated September 9, 1930 and August 11, 1931, respectively. During operative runs, the preferred temperatures for the conversion or transforming catalyst are from 800 to 1000° F.; for the gas purifying catalyst, from 350° to 700° F.; and for the refining catalyst from 400 to 650° F. The temperatures during regeneration will depend, to a considerable extent, upon the catalyst used. For regeneration by oxidation, the temperature should not fall below 800° F., and if the catalyst comprise or contain hydrosilicate of alumina, the temperature should not be allowed to rise much above 1050° F. Operative runs may be made under atmospheric or superatmospheric pressure, and if desired, with different pressures in the various parts of the apparatus.

The regeneration of all of the catalyst or contact masses is preferably effected by oxidation.

For conversion chambers 4 and 4a, the regenerating medium may be admitted through valved inlets 90 and 90a, and the fumes vented through valved outlets 91 and 91a. For the gas purifying chambers 58 and 58a, the regenerating medium is admitted by valved inlets 92 and 92a, and the fumes are discharged through valved outlets 93 and 93a. For refining chambers 63 and 63a, the regenerating medium may be admitted by valved inlets 94 and 94a, and the fumes discharged through valved outlets 95 and 95a.

From the above it will be apparent that the use of a refining catalyst in chambers 63, 63a capable of producing a polymerizing effect upon the very light hydrocarbons such as those present in the fixed gases and including those released during the stabilizing step, or which produces a combined polymerization and hydrogenation so that such very light hydrocarbons are brought within the gasoline range, will result in decidedly important advantages and in an appreciable increase in the quantity of the finished motor fuel product. By segregating the gases and subjecting the same to a purifying operation which removes all compounds having a deleterious effect upon the refining catalyst, the rapid poisoning of the latter, which would otherwise occur, is avoided, and proper action of the refining catalyst is assured over an extended period. In this way a maximum yield of finished product of uniform quality is produced and unduly frequent regenerations of the refining catalyst are avoided. Moreover a single catalyst can be adopted as standard for the refining of any crude. One composition which gives excellent results comprises 98% activated clay and 2% nickel oxide in finely divided form. The two components are blended, molded into pieces of suitable size, and baked at 1000° F. to provide an active mass in which both components are independently active and in the proper proportions to cause the polymerizing and hydrogenating effects referred to above. In a refining catalyst of such composition, the metallic oxide component should comprise less than 10% of the total.

I claim as my invention:

1. In the treatment of low boiling converted hydrocarbons including fixed gases and condensible material within the motor fuel range, the process steps which comprise separating the fixed gases from the condensible material, subjecting the gases to desulphurization and the condensible material to stabilization to remove entrained fixed gases, and then directing both the desulphurized gases and the stabilized material into contact with a refining catalyst comprising essentially activated clay with a small amount of metallic oxide which has a polymerizing effect upon said gases.

2. In the production of refined motor fuel stable against oxidation, the process which comprises transforming high boiling hydrocarbons partially into low boiling hydrocarbons including fixed gases and condensible material in the gasoline boiling range, separating the converted low boiling material into gaseous and liquid portions by a condensing operation, treating the said gaseous portion to remove additional liquid, treating the said liquid portion to remove additional gases, purifying all of the gases by removal of H₂S and other sulphur compounds and then subjecting both the separated purified gases and the separated liquid to a single catalytic refining and polymerizing operation by contacting the same with a mass comprising activated clay containing about 2% of nickel oxide.

3. In the production of refined motor fuel from converted hydrocarbon starting material, the process steps which comprise taking an overhead fraction of the converted material including gases and condensible vapors of the desired boiling range, separating the fixed gases by condensing the remainder of the fraction, subjecting said gases to a desulphurizing operation, revaporizing the condensate, and then subjecting both the desulphurized gases and the revaporized portion of the fraction to a single catalytic refining mass comprising activated clay containing less than ten per cent. by weight of metallic oxide in the temperature range of 400° to 650° F. to effect a refining and polymerizing operation.

4. In the production of refined motor fuel from high boiling hydrocarbon starting material after partial conversion of the same into low boiling hydrocarbons, the process steps which comprise fractionating the products of the converting step to separate out the low boiling hydrocarbons from the high boiling hydrocarbons, separating fixed gases from the remainder of the low boiling hydrocarbons both by condensation and by stabilization of the condensate to remove entrained fixed gases, subjecting said gases to a desulphurizing operation, and then subjecting the desulphurized gases and the remainder of the low boiling hydrocarbons together in vapor phase to a single catalytic refining and polymerizing operation by contacting the same with a mass comprising activated clay and a small percentage of metallic oxide in the temperature range of 400° to 650° F.

5. In apparatus for securing a stable finished product from complex hydrocarbon vapors, a fractionator into which the vapors are discharged, a condenser connected to the upper end of said fractionator to reduce an overhead cut therefrom to liquid condensate and fixed gases, a separator into which said condenser discharges for removing the fixed and uncondensed gases, heating and purifying means for said gases, a stabilizer for the condensate, a vaporizer for the stabilized condensate, a container having an active catalytic mass for refining said purified gases along with the vapors from said vaporizer, means for conducting the fixed and uncondensed gases from said separator through said heating and purifying means and thence into said container, and means for conducting the liquid condensate from said separator through said stabilizer, then through said vaporizer and thence into said container.

6. In apparatus for securing a finished product from complex hydrocarbon material and gases, a fractionator into which the material and gases are discharged, a condenser connected to the upper end of said fractionator to reduce the overhead cut therefrom to liquid condensate and fixed gases, a separator into which said condenser discharges for removing fixed gases, means for heating said gases, a plurality of containers each having a contact mass therein for purifying said gases, a vaporizer for the liquid condensate, a plurality of containers each having a catalytic mass therein for refining said purified gases and the vapors from said vaporizer, means for conducting the fixed gases from said separator to said heating means, thence to said purifying containers, and thence to said catalytic containers, means for conducting liquid condensate from said separator to said vaporizer and thence to said catalytic containers, both said sets of containers having connections and controls permitting al- 7. In apparatus for securing a stable refined motor fuel from complex hydrocarbon vapors, a fractionator into which the vapors are discharged, a condenser connected to said fractionator and receiving the overhead gases and vapors from the latter to reduce the same to liquid condensate and fixed gases, a gas separator into which said condenser discharges, an absorber receiving the fixed gases issuing from said separator, a heater into which said absorber discharges its liquid products, a second condenser receiving the overhead material from said heater for reducing the same to liquid condensate and fixed gases, a second gas separator, heating and purifying means for the gases issuing from said absorber and from said second gas separator including chambers containing contact masses alternately in operation and in regeneration and alternately receiving said gases, means conducting fixed gases from the upper part of said absorber and from said second gas separator to said heating and purifying means, a stabilizer, means for conducting condensate from both said condensers to said stabilizer, a vaporizer, means for conducting the stabilized condensate from said stabilizer to said vaporizer, chambers containing refining catalysts alternately in operation and in regeneration and alternately receiving simultaneously said purified gases and said vaporized stabilized condensate, means for conducting purified gases from said first named chambers to said last named chambers, means for conducting vaporized condensate from said vaporizer to said last named chambers, and means for regenerating the contact masses in all of said chambers.

8. In apparatus for producing a stable refined motor fuel in the gasoline boiling range from complex hydrocarbon vapors, a fractionator into which the vapors are discharged, a condenser connected to the upper part of said fractionator to receive an overhead cut and to reduce the same to liquid condensate and fixed gases, a gas separator receiving the products of said condenser, absorbing means for receiving the fixed gases issuing from said separator, a heater into which said absorbing means discharges its liquid products, a second condenser receiving the overhead gases and vapors from said heater to reduce the same to liquid condensate and fixed gases, a second gas separator into which said second condenser discharges its products, heating and purifying means for the gases issuing from said absorbing means and from said second gas separator comprising chambers containing contact masses alternately in operation and in regeneration and alternately receiving said gases, means connecting said absorbing means and said second gas separator to said heating and purifying means, stabilizing means, means for conducting liquid condensate from both said condensers to said stabilizing means, vaporizing means for receiving the stabilized condensate from said stabilizing means, refining means for both the purified gases and vaporized condensate comprising chambers containing catalytic masses alternately in operation and in regeneration, means for conducting purified gases from said second named chambers and vaporized and stabilized condensate from said stabilizing means to said last named chambers, and connections and controls for by-passing said stabilizing means.

EUGENE J. HOUDRY.